United States Patent
Tremblay et al.

(10) Patent No.: US 7,127,643 B2
(45) Date of Patent: Oct. 24, 2006

(54) METHOD AND APPARATUS FOR FIXING BIT ERRORS ENCOUNTERED DURING CACHE REFERENCES WITHOUT BLOCKING

(75) Inventors: Marc Tremblay, Menlo Park, CA (US); Shailender Chaudhry, San Francisco, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 714 days.

(21) Appl. No.: 10/288,941

(22) Filed: Nov. 6, 2002

(65) Prior Publication Data
US 2003/0093726 A1    May 15, 2003

Related U.S. Application Data

(60) Provisional application No. 60/337,734, filed on Nov. 9, 2001.

(51) Int. Cl.
G06F 11/00 (2006.01)
(52) U.S. Cl. ............................................. 714/52
(58) Field of Classification Search ................ 714/748, 714/805; 711/118–134
See application file for complete search history.

(56) References Cited

U.S. PATENT DOCUMENTS

| 4,598,402 A | 7/1986 | Matsumoto et al. ......... 371/38 |
| 5,226,150 A | 7/1993 | Callander et al. ........... 395/575 |
| 6,038,693 A | 3/2000 | Zhang ........................ 714/768 |
| 6,502,218 B1 * | 12/2002 | George et al. .............. 714/805 |
| 6,571,317 B1 * | 5/2003 | Supnet ....................... 711/133 |
| 6,961,824 B1 * | 11/2005 | Rowlands et al. .......... 711/137 |

* cited by examiner

Primary Examiner—Albert Decady
Assistant Examiner—Sam Rizk
(74) Attorney, Agent, or Firm—Park, Vaughan & Fleming, LLP

(57) ABSTRACT

One embodiment of the present invention provides a system that fixes bit errors encountered during references to a cache memory. During execution of an application, the system performs a reference to the cache memory by retrieving a data item and an associated error-correcting code from the cache memory. Next, the system computes an error-correcting code from the retrieved data item and compares the computed error-correcting code with the associated error-correcting code. If the computed error-correcting code does not match the associated error-correcting code a bit error has occurred. In this case, the system stores an identifier for the reference in a register within a set of one or more registers associated with the cache memory, so that the bit error can be fixed at a later time. The system also allows the application to continue executing.

17 Claims, 4 Drawing Sheets

METHOD AND APPARATUS FOR FIXING BIT ERRORS ENCOUNTERED DURING CACHE REFERENCES WITHOUT BLOCKING

RELATED APPLICATION

This application hereby claims priority under 35 U.S.C. §119 to U.S. Provisional Patent Application No. 60/337,734, filed on Nov. 9, 2001, entitled "Method and Apparatus for Fixing Bit Errors Encountered During Cache References Without Blocking," by inventors Shailender Chaudhry and Marc Tremblay.

BACKGROUND

1. Field of the Invention

The present invention relates to mechanisms for providing fault-tolerance within computing systems. More specifically, the present invention relates to a method and an apparatus for fixing bit errors encountered during cache references without blocking concurrently executing threads and/or processes.

2. Related Art

Rapid advances in semiconductor technology presently make it possible to incorporate large caches onto a microprocessor chip. For example, some microprocessors include multiple processors and associated level one (L1) caches that access a large level two (L2) cache, wherein all of these structures reside on the same microprocessor chip. Locating the L2 cache on the microprocessor chip dramatically decreases the time required to access the L2 cache, and can thereby increase performance of the microprocessor system.

However, large on-chip caches are susceptible to random bit errors. One solution to this problem is to use error-correcting codes to detect and correct these errors. Semiconductor memories located outside a microprocessor chip often include additional space for storing an error-correcting code for each data word. When a data word is first stored to the memory, an error-correcting code is calculated from the data word, and this error-correcting code is stored along with the data word in the memory. When the data word is subsequently retrieved from the memory, the error-correcting code is also retrieved. At the same time, a new error-correcting code is calculated for the retrieved data word. If the new error-correcting code differs from the retrieved error-correcting code, a bit error has occurred in either the data word of the error-correcting code. In this case, the error-correcting code can be used to correct the bit error.

This process of reading data, detecting an error and correcting the error involves a read-modify-write (RMW) operation. Implementing a RMW operation to correct errors introduces additional delay into a cache access which can greatly reduce computer system performance, and can require additional circuitry that consumes valuable on-chip real estate. Consequently, large on-chip caches presently do not support a RMW operation to detect and correct bit errors. An existing on-chip cache simply checks for data errors during read operations, and if a data error is detected, the entire system simply stops, thereby preventing other requests from accessing the cache. Alternatively, a trap can be generated and overflow buffers can be used to pile up outstanding transactions.

In single-chip multiprocessor systems, a large number of transactions may be outstanding at any given time from multiple processors and threads. Hence, providing a mechanism to stop all transactions, or to pile up outstanding requests, introduces a significant amount of complexity and consumes valuable on-chip real estate.

Hence, what is needed is a method and an apparatus for fixing bit errors encountered during references to an on-chip cache without significantly complicating design of the on-chip cache and without stopping outstanding transactions from progressing through the memory subsystem.

SUMMARY

One embodiment of the present invention provides a system that fixes bit errors encountered during references to a cache memory. During execution of an application, the system performs a reference to the cache memory by retrieving a data item and an associated error-correcting code from the cache memory. Next, the system computes an error-correcting code from the retrieved data item and compares the computed error-correcting code with the associated error-correcting code. If the computed error-correcting code does not match the associated error-correcting code a bit error has occurred. In this case, the system stores an identifier for the reference in a register within a set of one or more registers associated with the cache memory, so that the bit error can be fixed at a later time. The system also allows the application to continue executing.

In a variation on this embodiment, the system subsequently fixes the bit error in the cache memory. This involves reading the identifier for the reference from the register, and using the identifier to retrieve the data item and the associated error-correcting code from the cache. It also involves using the associated error-correcting code to produced a corrected data item and error-correcting code, and then storing the corrected data item and error-correcting code into the cache memory.

In a variation on this embodiment, fixing the bit error involves fixing the bit error at a periodic interval determined by an operating system tick timer.

In a variation on this embodiment, retrieving the data item with the associated error-correcting code involves retrieving a tag for the reference with an associated error-correcting code for the tag from the cache memory. It also involves retrieving a data line for the reference with an associated error-correcting code for the data line.

In a variation on this variation, if the bit error is detected in the tag, the system forces a cache miss to cause the reference to be stored in a miss buffer for the cache, whereby the reference can be retried at the later time after the bit error is fixed. This allows the system to continue execution of other threads in the application while a thread that made the reference waits for the reference to complete. In further variation, if the reference is stored in the miss buffer, the system forces a cache fill operation to cause the reference to be activated from the miss buffer after the bit error has been fixed.

In a variation on this embodiment, if the bit error is detected in a data line, the system corrects the bit error through circuitry located on a data path between the cache memory and a processor.

In a variation on this embodiment, registers in the set of one or more registers are organized as a circular buffer that allows entries to be overwritten.

In a variation on this embodiment, the cache memory is a level two (L2) cache or lower in a memory hierarchy.

In a variation on this embodiment, the error-correcting code corrects single-bit errors and detects double-bit errors.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Multiprocessor System

Figure 1:
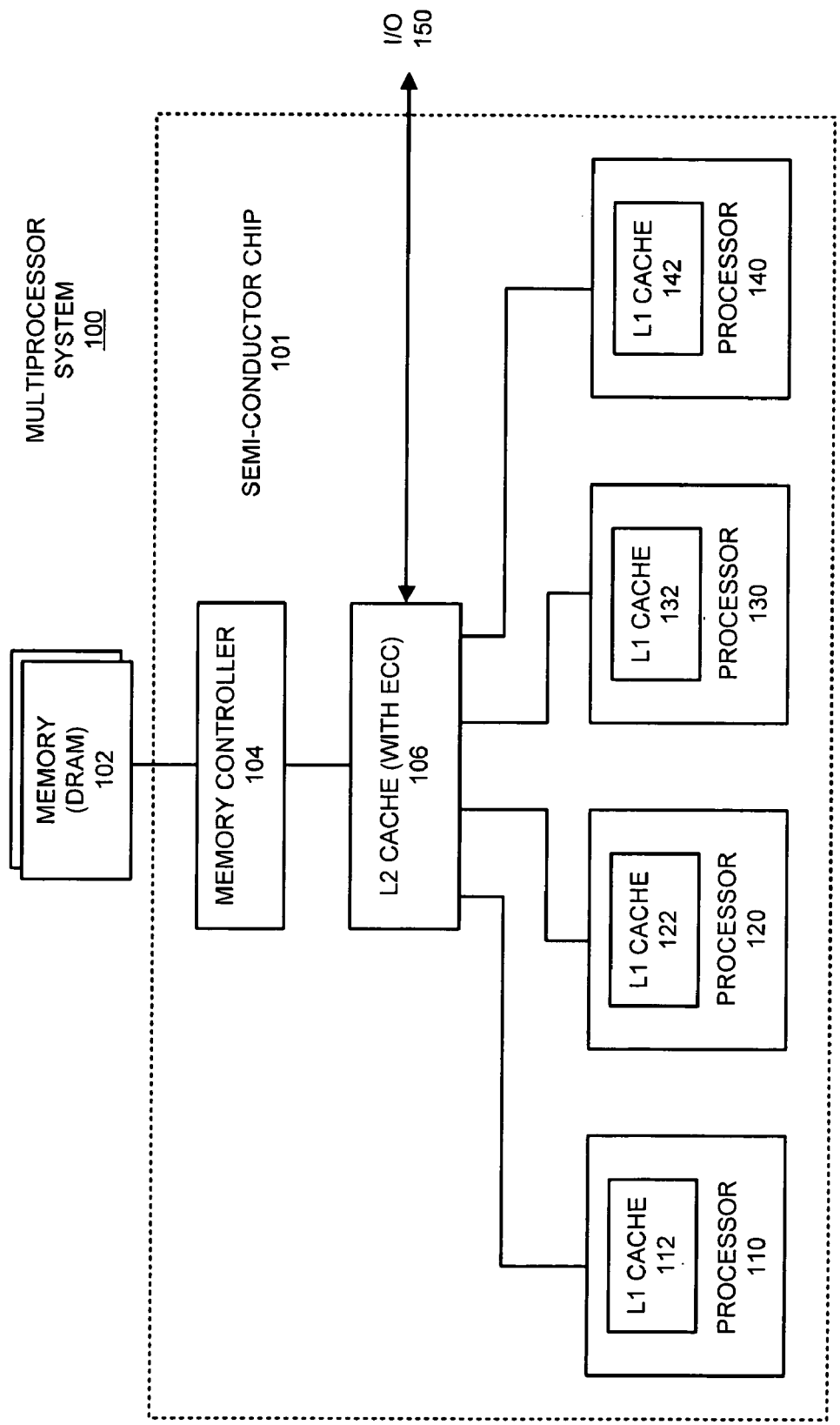
FIG. 1 illustrates a multiprocessor system including an L2 cache that provides error correction in accordance with an embodiment of the present invention.

FIG. 1 illustrates a multiprocessor system 100 including a level two (L2) cache 106 that provides error correction in accordance with an embodiment of the present invention. Note much of multiprocessor system 100 is located within a single semiconductor chip 101. More specifically, semiconductor chip 101 includes a number of processors 110, 120, 130 and 140, which contain level one (L1) caches 112, 122, 132 and 142, respectively. Note that the L1 caches 112, 122, 132 and 142 may be separate instruction and data caches, or alternatively, unified instruction/data caches. L1 caches 112, 122, 132 and 142 are coupled to L2 cache 106 which makes use of error-correcting code as is described in more detail with reference to FIGS. 2–4 below. L2 cache 106 is coupled to off-chip memory 102 through memory controller 104.

In one embodiment of the present invention, L1 caches 112, 122, 132 and 142 are write-through caches, which means that all updates to L1 caches 112, 122, 132 and 142 are automatically propagated to L2 cache 106. This simplifies the coherence protocol, because if processor 110 requires a data item that is present in L1 cache 112, processor 110 can receive the data from L2 cache 106 without having to wait for L1 cache 112 to source the data.

Although the present invention is described in the context of an L2 cache 106, the present invention can generally be applied to any type of cache, including an L3 cache, or possibly even an L1 cache. Furthermore, although the present invention is described in the context of a set-associative cache, the present invention can also be applied to direct-mapped caches.

Cache Structure

Figure 2:
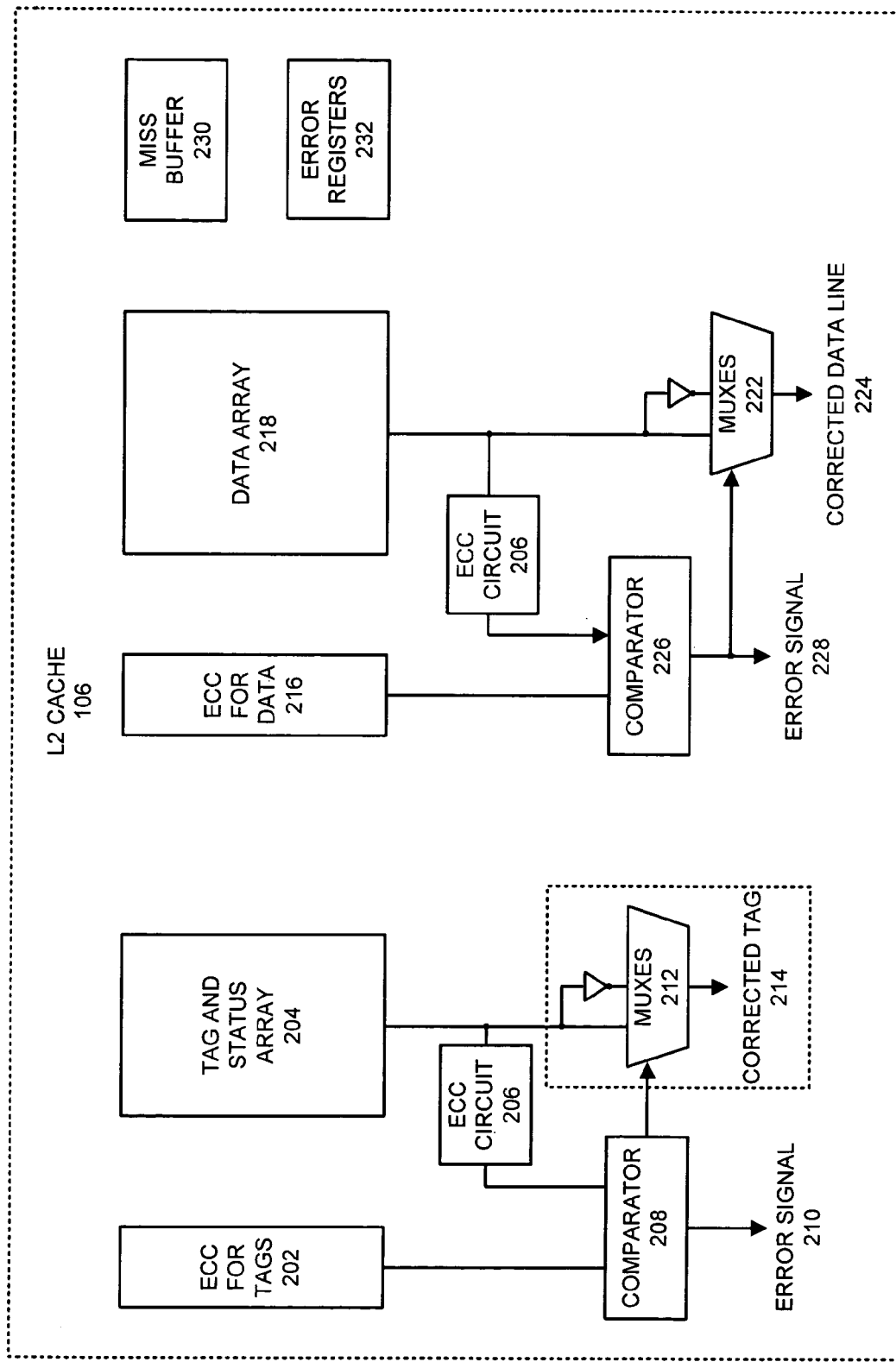
FIG. 2 illustrates the structure of the L2 cache from FIG. 1 in accordance with an embodiment of the present invention.

FIG. 2 illustrates the structure of L2 cache 106 from FIG. 1 in accordance with an embodiment of the present invention. Like a conventional cache memory, L2 cache 106 includes a memory array for storing tag and status information 204 as well as a memory array for storing data lines 218. Note that if L2 cache 106 is a set-associative cache, tag and status array 204 and data array 218 include multiple entries for each set.

L2 cache 106 also includes a miss buffer 230 that stores memory requests that missed while accessing L2 cache 106 and are waiting for a cache line to be returned from memory 102. Note that each entry in miss buffer 230 includes a bit that indicates if a cache line has been requested from memory 102.

For purposes of clarity, a number of common cache structures are not illustrated in FIG. 2, such as comparators for determining whether a given reference is a cache hit.

L2 cache 106 also includes a number of new structures relating to error-correcting codes, including error registers 232, error-correcting code (ECC) for tags 202, ECC for data 216, ECC circuits 206 and 220, comparators 208 and 226, and multiplexers (MUXes) 212 and 222.

Error registers 232 contain addresses for cache references for which errors were detected. In one embodiment of the present invention, error registers 232 are organized as a circular buffer with a head pointer and a tail pointer. However, unlike a conventional circular buffer, when this circular buffer becomes full, older entries in the circular buffer are simply overwritten. This means that some errors may go uncorrected. However, note that the system will still keep functioning, and the error is likely to be corrected the next time the address is accessed.

ECC for tags 202 includes an ECC for each entry in tag and status array 204. Similarly, ECC for data 216 includes an ECC for each entry in data array 218.

The one or more tags accessed for a given set from tag and status array 204 pass through ECC circuit 306 which produces a new ECC for each tag/status word. Comparator 208 compares new ECC against an ECC retrieved from FCC for tags 202. If these ECCs do not match, error signal 210 is asserted.

The circuit can optionally include multiplexers 212 that produce a corrected tag/status word 214 that is used to correct the tag/status word in some implementations of the present invention.

The one or more data lines accessed for a given set from data array 218 pass through ECC circuit 220, which produces a new ECC for each data line. Comparator 226 compares each new ECC against an ECC retrieved from ECC for tags 202. If these ECCs do not match, error signal 228 is asserted.

The circuit also includes multiplexers 222 that produce a corrected data line 224.

Process of Handling an Error

Figure 3:
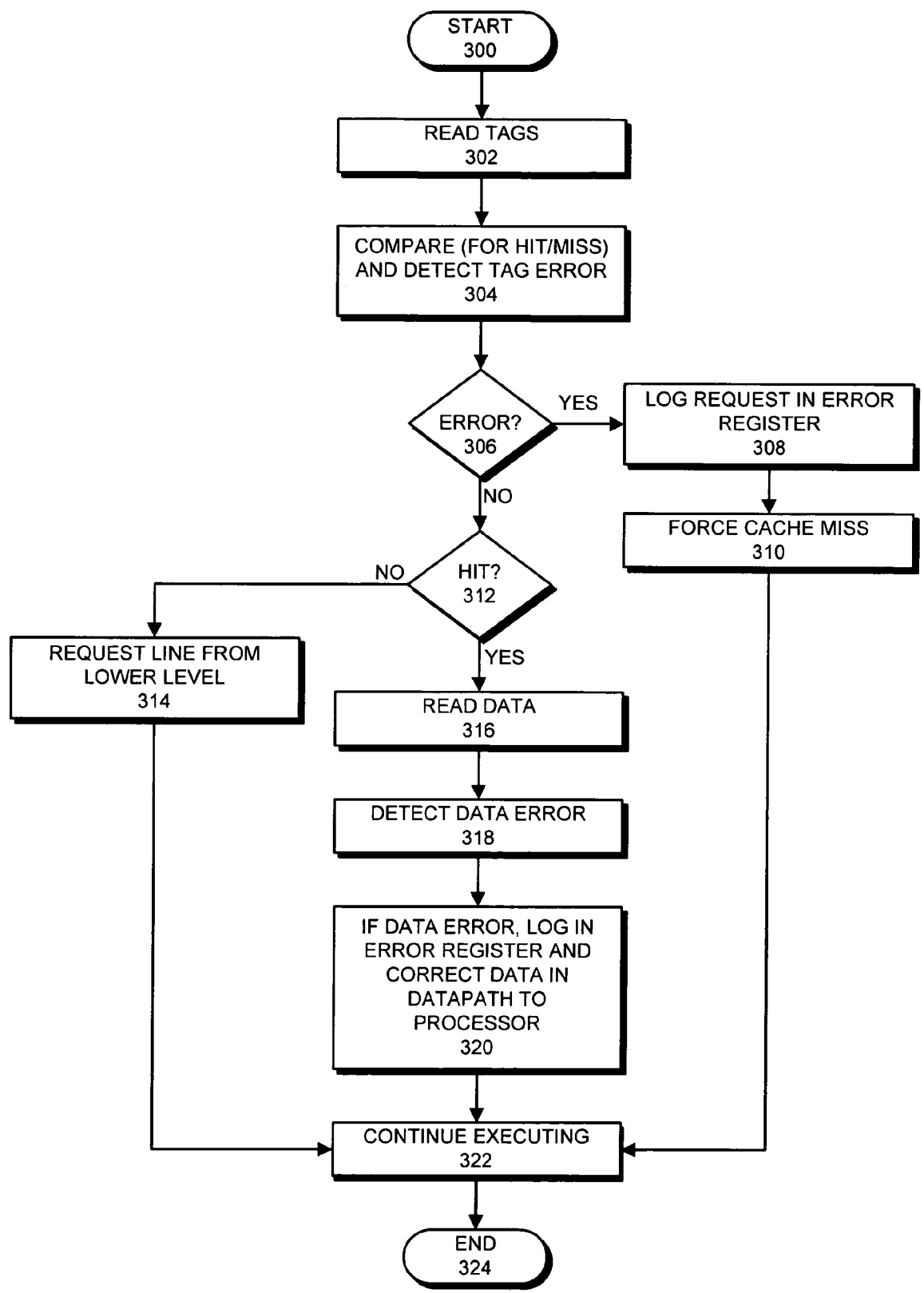
FIG. 3 is a flow chart illustrating the process of handling an error during a cache reference in accordance with an embodiment of the present invention.

FIG. 3 is a flow chart illustrating the process of handling an error during a cache reference in accordance with an embodiment of the present invention. Upon receiving a request to access L2 cache 106, the system reads tags for the set specified by the address of the request (step 302). The system then compares the tags to determine whether or not the request generates a cache hit. At the same time the circuitry illustrated in FIG. 2 also detects a tag error if one exists (step 304).

If a tag error is detected, the system logs the address of the request in error registers 232 (step 308), and forces cache a miss to cause the request to be stored in miss buffer 230 along with requests that are waiting for a cache line to be retrieved from memory 102 (step 310). Note that there is no time to correct the tags before the tags are compared with the address of the request, unless the cycle time or the load latency is increased.

Next, the system allows other processes/threads to continue executing while the thread made the request waits for the request to complete (step 322). In this way, multiprocessor system 100 does not have to completely cease execution because a single thread encountered a tag error.

If an error was not detected in step 304, the system determines if there was a cache hit (step 312). If not, the system generates a cache miss, which causes a cache line to be requested from memory 102 (step 314). The system then allows other threads/processes that are not waiting for the cache miss to return to continue executing (step 322).

If there was a cache hit at step 312, the system reads corresponding data lines from the data array (step 316), and attempts to detect data errors using the circuitry illustrated in FIG. 2 (step 318).

If there is a data error, the system logs the address of the request that caused the error into error registers 232, and corrects the data error in downstream circuitry on a data path to the processor (step 320).

Next, the system continues executing (step 322).

Process of Fixing an Error

Figure 4:
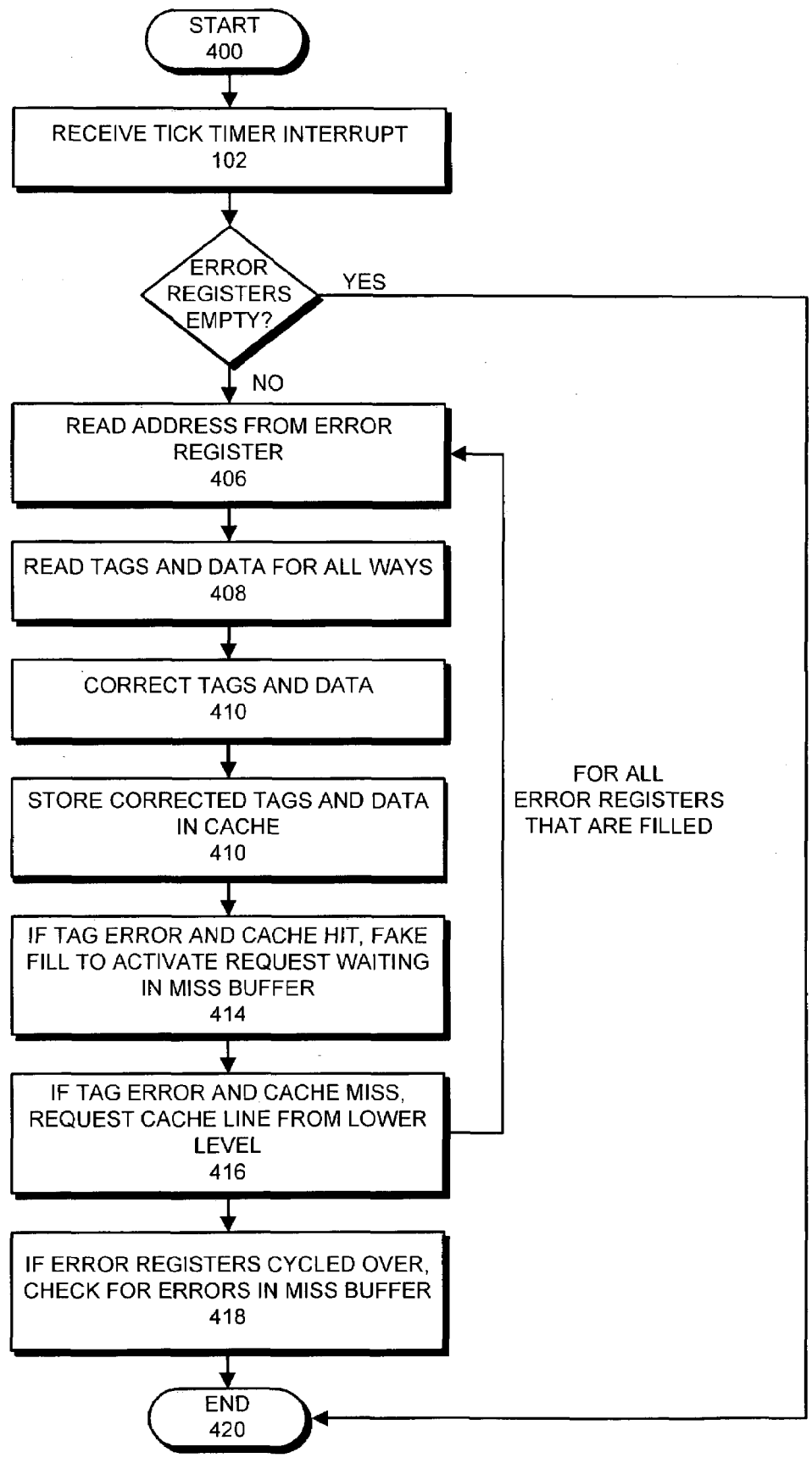
FIG. 4 is a flow chart illustrating how errors are fixed in accordance with an embodiment of the present invention.

FIG. 4 is a flow chart illustrating how errors are fixed in accordance with an embodiment of the present invention. The system starts by receiving an interrupt from the operating system tick timer (step 402).

In addition to performing the normal processor management tasks associated with the tick timer, the system determines if error registers 232 are empty (step 404). If so, no error has occurred, and the system resumes normal program execution.

If error registers 232 are not empty, the system reads an address from an error register (step 406). Next, the system reads tags and data for all ways of the set specified by the address (step 408). The system then corrects tag and data errors as necessary (step 410) before storing the corrected tags and data back into L2 cache 106 (step 412).

If there is a tag error and a cache hit, the system performs a fake cache fill operation to activate any requests that may be waiting in miss buffer 230 (step 414). Note that miss buffer 230 will not attempt to access the cache until miss buffer 230 thinks a cache fill for its requested data has been performed.

If there is a tag error and a cache miss, the system requests a cache line from a lower level of the memory hierarchy (step 416). The system then repeats steps 406, 408, 410, 412, 414 and 416 for all error registers that are filled with address information.

Note that if error registers 232 become overly full and a register is overwritten, the system checks for errors in miss buffer 230 that may be waiting for an overwritten tag error to be fixed (step 418). Any overwritten tag errors detected in this way can be corrected by repeating steps 406, 408, 410, 412, 414 and 416.

In one embodiment of the present invention, much of the process of fixing an error is implemented in software, whereas much of the process of detecting and logging an error is implemented in hardware.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for fixing bit errors encountered during references to a cache memory, comprising:

performing a reference to the cache memory during execution of an application;

wherein performing the reference involves retrieving a data item and an associated error-correcting code from the cache memory;

computing an error-correcting code from the retrieved data item; and comparing the computed error-correcting code with the associated error-correcting code;

wherein if the computed error-correcting code does not match the associated error-correcting code indicating that a bit error has occurred, the method further comprises, storing an identifier for the reference in a set of one or more registers associated with the cache memory, so that the bit error can be fixed at a later time, and continuing execution of the application; and fixing the bit error in the cache memory at the later time by:

reading the identifier for the reference from the register, using the identifier to retrieve the data item and the associated error-correcting code, using the associated error-correcting code to produced a corrected data item and error-correcting code, and storing the corrected data item and error-correcting code to the cache memory;

wherein fixing the bit error involves fixing the bit error at a periodic interval determined by an operating system tick timer.

2. The method of claim 1, wherein retrieving the data item with the associated error-correcting code involves:

retrieving a tag for the reference with an associated error-correcting code for the tag from the cache memory; and retrieving a data line for the reference with an associated error-correcting code for the data line.

3. The method of claim 2, wherein if the bit error is detected in the tag, the method further comprises forcing a cache miss to cause the reference to be stored in a miss buffer for the cache, whereby the reference can be retried at the later time after the bit error is fixed; and wherein continuing execution of the application involves continuing execution of other threads in the application while a thread that made the reference waits for the reference to complete.

4. The method of claim 3, wherein if the reference is stored in the miss buffer, the method further comprises forcing a cache fill operation to cause the reference to be activated from the miss buffer after the bit error has been fixed.

5. The method of claim 2, wherein if the bit error is detected in the data line, the method further comprises correcting the bit error through circuitry located on a data path between the cache memory and a processor.

6. The method of claim 1, wherein registers in the set of one or more registers are organized as a circular buffer that allows entries to be overwritten.

7. The method of claim 1, wherein the cache memory is a level two (L2) cache or lower in a memory hierarchy.

8. The method of claim 1, wherein the error-correcting code corrects single-bit errors and detects double-bit errors.

9. An apparatus that fixes bit errors encountered during references to a cache memory, comprising:

the cache memory;

an input of the cache memory that is configured to receive a reference from an application;

a retrieval mechanism that is configured to retrieve a data item and an associated error-correcting code for the reference from the cache memory;

an error-correcting code circuit that is configured to compute an error-correcting code from the retrieved data item;

a comparator that is configured to detect a bit error by comparing the computed error-correcting code with the associated error-correcting code;

a set of one or more registers for storing identifiers for errors that are detected during cache references;

an error logging mechanism, wherein if a bit error has occurred, the error logging mechanism is configured to store an identifier for the reference in a register in the set of one or more registers, so that the bit error can be fixed at a later time; and a bit error fixing mechanism that is configured to:
  read the identifier for the reference from the register,
  use the identifier to retrieve the data item and the associated error-correcting code,
  use the associated error-correcting code to produced a corrected data item and error-correcting code, and to store the corrected data item and error-correcting code to the cache memory:
  wherein the bit error fixing mechanism is configured to fix bit errors at a periodic interval determined by an operating system tick timer.

10. The apparatus of claim 9, wherein the retrieval mechanism is configured to:
  retrieve a tag for the reference with an associated error-correcting code for the tag from the cache memory; and to
  retrieve a data line for the reference with an associated error-correcting code for the data line.

11. The apparatus of claim 10, wherein if the bit error is detected in the tag, the error logging mechanism is configured to trigger a cache miss to cause the reference to be stored in a miss buffer for the cache memory, whereby the reference can be retried at the later time after the bit error is fixed, thereby allowing continued execution of other threads in the application while a thread that made the reference waits for the reference to complete.

12. The apparatus of claim 11, wherein if the reference is stored in the miss buffer, the apparatus is additionally configured to force a cache fill operation to cause the reference to be activated from the miss buffer after the bit error in the tag is fixed.

13. The apparatus of claim 10, further comprising circuitry located on a data path between the cache memory and a processor for correcting bit errors in data lines.

14. The apparatus of claim 9, wherein registers in set of one or more registers are organized as a circular buffer that allows entries to be overwritten.

15. The apparatus of claim 9, wherein the cache memory is a level two (L2) cache or lower in a memory hierarchy.

16. The apparatus of claim 9, wherein the error-correcting code corrects single-bit errors and detects double-bit errors.

17. An apparatus that fixes bit errors encountered during references to a cache memory, comprising:
  the cache memory;
  an input of the cache memory that is configured to receive a reference from an application;
  a retrieval mechanism that is configured to retrieve a data item and an associated error-correcting code for the reference from the cache memory;
  wherein the retrieval mechanism is configured to,
    retrieve a tag for the reference with an associated error-correcting code for the tag from the cache memory, and to
    retrieve a data line for the reference with an associated error-correcting code for the data line;
  an error-correcting code circuit that is configured to compute an error-correcting code from the retrieved data item;
  a comparator that is configured to detect a bit error by comparing the computed error-correcting code with the associated error-correcting code;
  a set of one or more registers for storing identifiers for errors that are detected during cache references;
  an error logging mechanism, wherein if a bit error has occurred, the error logging mechanism is configured to store an identifier for the reference in a register in the set of one or more registers, so that the bit error can be fixed at a later time; and
  a bit error fixing mechanism that is configured to,
    read the identifier for the reference from the register,
    use the identifier to retrieve the data item and the associated error-correcting code for the reference,
    use the associated error-correcting code to produced a corrected data item and error-correcting code, and to
    store the corrected data item and error-correcting code to the cache memory;
  wherein the bit error fixing mechanism is configured to fix bit errors at a periodic interval determined by an operating system tick timer.

* * * * *